United States Patent [19]

McClear et al.

[11] Patent Number: 5,715,405
[45] Date of Patent: Feb. 3, 1998

[54] TRANSCEIVER CIRCUIT WITH TRANSITION DETECTION

[75] Inventors: Mark T. McClear; Christopher Wellheuser, both of Plano, Tex.

[73] Assignee: Texas Instruments Incorporated, Dallas, Tex.

[21] Appl. No.: 473,588

[22] Filed: Jun. 7, 1995

Related U.S. Application Data

[62] Division of Ser. No. 228,067, Apr. 15, 1994, Pat. No. 5,469,473.

[51] Int. Cl.⁶ .................................... G06F 13/00
[52] U.S. Cl. .................. 395/280; 365/233.5; 375/219
[58] Field of Search .............. 395/280; 340/825.6; 365/233.5; 375/7

[56] References Cited

U.S. PATENT DOCUMENTS

| | | | |
|---|---|---|---|
| 4,630,284 | 12/1986 | Cooperman | 375/7 |
| 4,700,342 | 10/1987 | Egami | 370/85 |
| 4,756,006 | 7/1988 | Rickard | 375/7 |
| 4,888,764 | 12/1989 | Haug | 370/85.1 |
| 5,003,467 | 3/1991 | Donaldson et al. | 364/200 |
| 5,097,157 | 3/1992 | Jaffe et al. | 307/530 |
| 5,216,667 | 6/1993 | Chu et al. | 375/7 |
| 5,243,623 | 9/1993 | Murdock | 375/7 |
| 5,307,324 | 4/1994 | Nishimoto | 365/233.5 |
| 5,418,526 | 5/1995 | Crawford | 340/825.06 |
| 5,418,756 | 5/1995 | McClure | 365/233.5 |

*Primary Examiner*—Jack B. Harvey
*Assistant Examiner*—David A. Wiley
*Attorney, Agent, or Firm*—Warren L. Franz; Mark E. Courtney; Richard L. Donaldson

[57] ABSTRACT

A bidirectional data transceiver circuit is described which automatically transfers data from a first bidirectional data port to a second bidirectional data port when new data is detected. The transceiver has a collision arbitration circuit which prevents the device from driving data onto a data port that is being driven externally. An additional embodiment is described wherein the transition detection circuitry of the transceiver is used to provide a input transition detection flag for an integrated circuit having standby or low power modes. An integrated circuit providing an array of the transceivers of the invention is described. A transceiver which automatically detects a transition in data and provides output drive for data busses is described. Other devices, system and methods are also described.

4 Claims, 4 Drawing Sheets

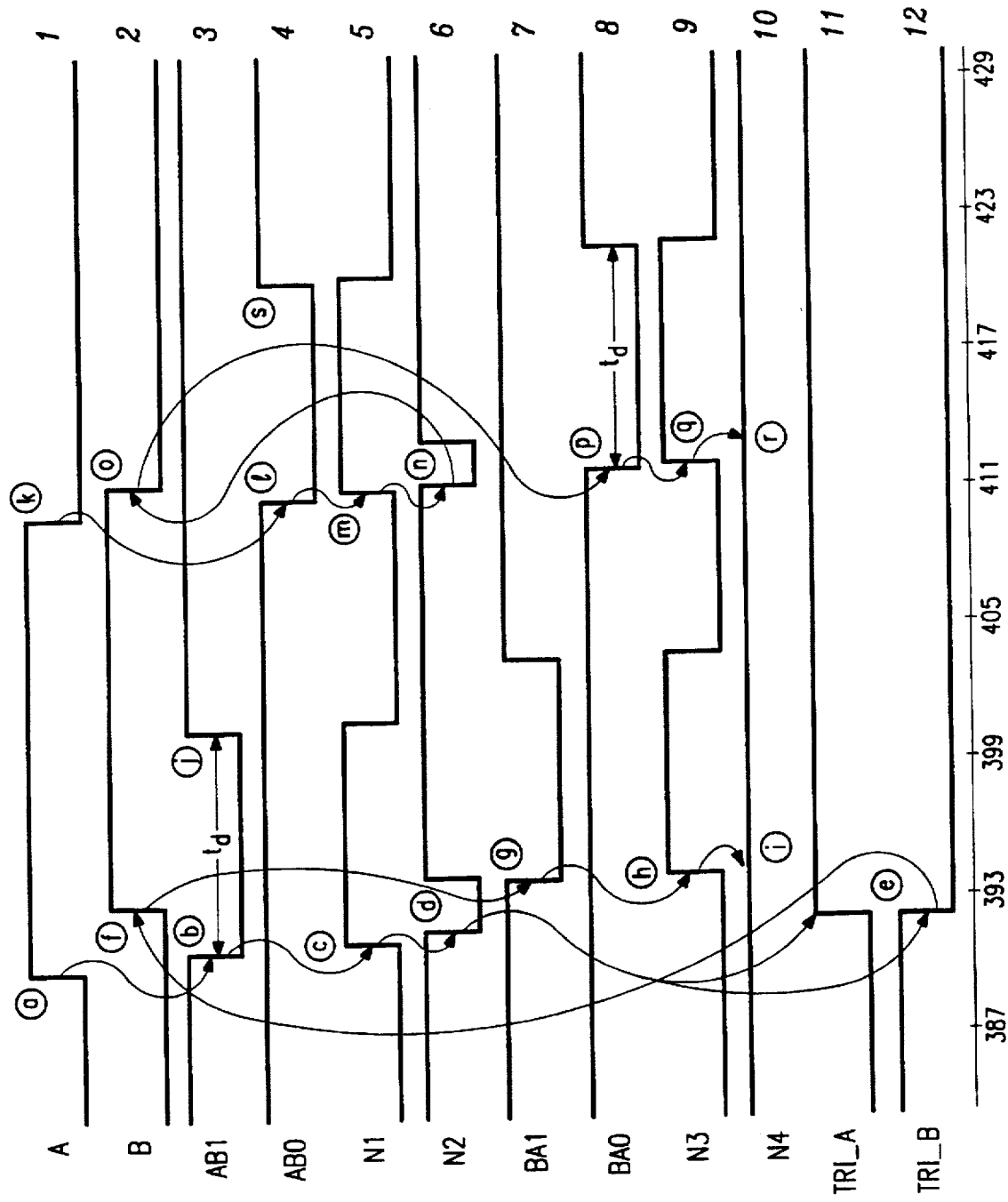

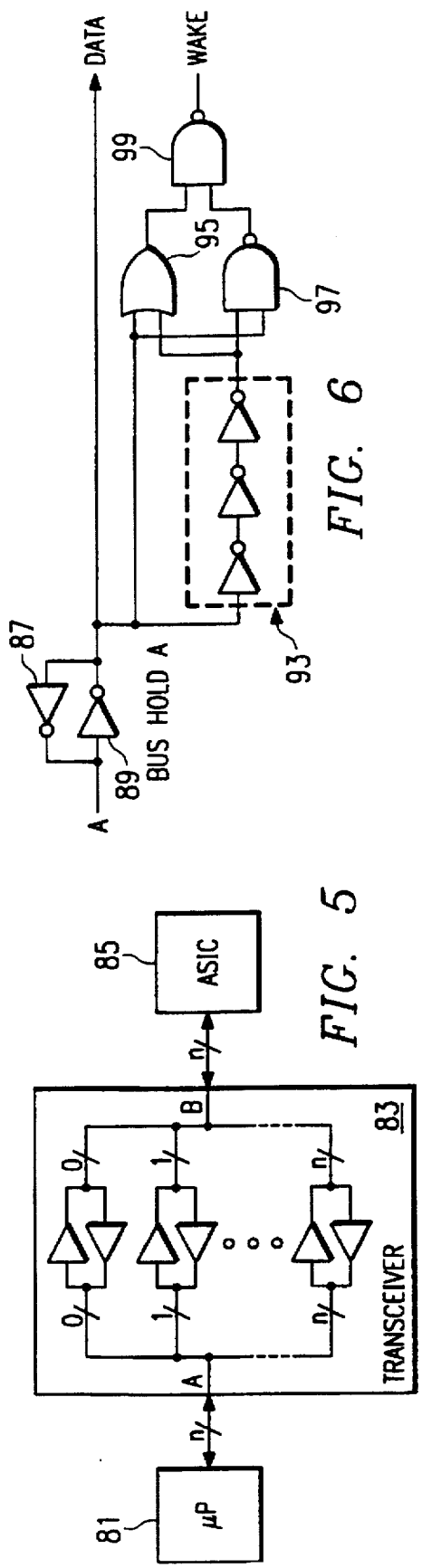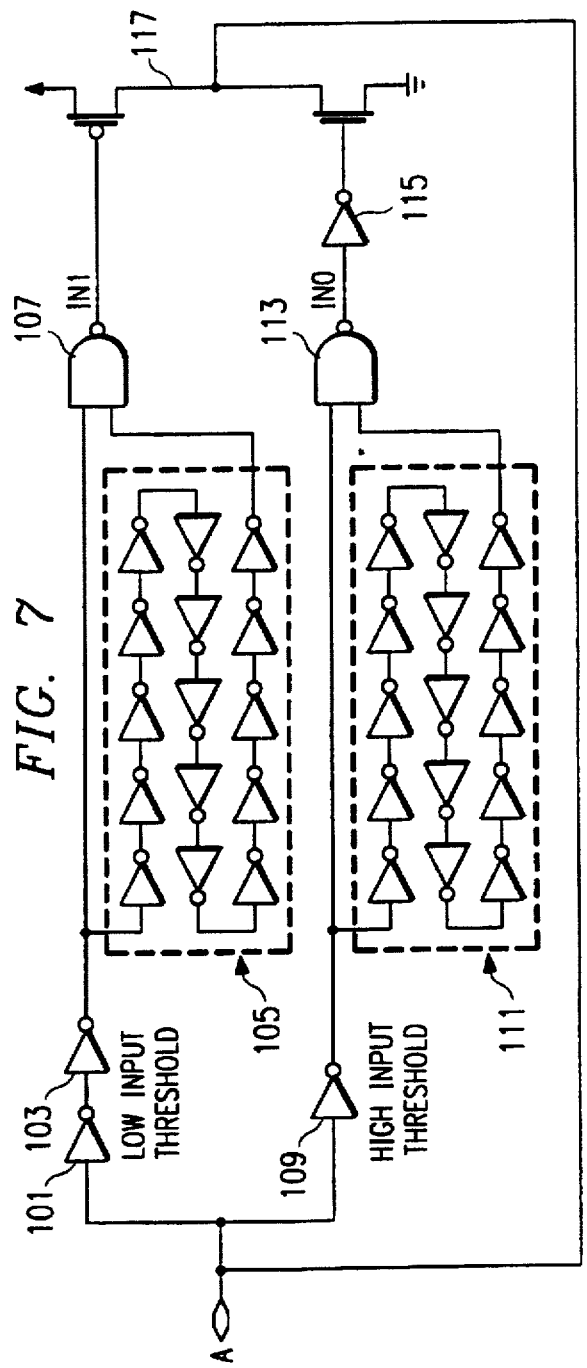

TRANSCEIVER CIRCUIT WITH TRANSITION DETECTION

This is a divisional of application Ser. No. 08/228,067, filed Apr. 15, 1994 now U.S. Pat. No. 5,469,473.

FIELD OF THE INVENTION

This invention relates generally to transceiver circuits and systems wherein data is transferred between devices across physical busses using transceiver circuits.

BACKGROUND OF THE INVENTION

In a system wherein one or more devices will transfer and receive data using physical busses such as cables, printed circuit board traces, wires, or the like, a transceiver device is often required. Typically, the system devices will both send and receive data on the bus so that the transceiver must provide a bidirectional capability, and the transceiver must drive the data in the direction of the transfer. Known transceiver circuits commonly require two control lines to facilitate this capability, one for enabling the transceiver and the other for determining the direction the bidirectional transceiver will drive data. FIG. 1 schematically depicts a typical known transceiver with direction (DIR) control lines, the transceiver connecting bidirectional ports A and B.

The transceiver of FIG. 1 continues to provide drive capability in the selected direction so long as the transceiver is enabled, even though the data transfer may be completed and there is no new information being transmitted. This results in unnecessary dynamic power consumption. The designer may limit this power consumption by adding control and timing circuitry, however this requires additional circuitry in the system. Another drawback of known transceivers is that they require two control lines to operate. As systems become more complex, the number of traces and pins needed for coupling the device to busses becomes critical, as these pins and traces are needed for data and status signals. Therefore it is desirable to provide a transceiver circuit which requires no control signals, thus freeing pins and signal traces previously requested for control for other uses; and which further consumes driving current and power only when necessary, thereby minimizing system power consumption.

SUMMARY OF THE INVENTION

Generally, and in one form of the invention, a bidirectional transceiver circuit is provided which automatically detects new activity on one of the busses it is coupled to, and then provides drive capability from that active bus to the other bus it is coupled to.

The invention also provides systems such as a transition detecting transceiver coupled between a processor and an array of memory devices, without control lines from the processor to the transceiver.

Another embodiment of the invention further provides an integrated circuit with low standby power consumption, or a so called "sleep" mode, with one-half of a transceiver used as a data input buffer and including the transition detection circuitry, thereby providing a means to alert the integrated circuit that new bus activity is taking place. This embodiment thus provides a means to "wake" the VLSI device without the need for an additional pin.

The invention further provides a transition detecting transceiver arranged as a bus kicker circuit or bus termination circuit. When a transition is detected on the bus the bus kicker enables an output driver to actively drive the bus to the same value for a predetermined time period, thus speeding the bus transition to the new value. Other applications will be obvious to the practitioner skilled in the art and are contemplated as well.

Each embodiment of the invention provides advantages over the prior art circuitry in that it automatically detects a transition at the input to a device and provides drive to an output without the need for enable or control lines, thus eliminating unnecessary traces and signals. The invention further provides an output that is active for a predetermined time, the driver then becoming inactive to save on seeded power consumption.

DESCRIPTION OF THE DRAWINGS

In the drawings:

FIG. 4 is a timing diagram that depicts the operation of various nodes of the transceiver circuit of FIG. 2 and FIG. 3;

FIG. 5 depicts a typical application using the transceiver circuit of the invention;

FIG. 6 depicts an integrated circuit which includes a second embodiment of the transceiver circuit of the invention;

FIG. 7 depicts the circuit diagram for the bus kicker circuit embodiment of the invention.

Corresponding numerals and symbols in the different figures refer to corresponding parts unless otherwise indicated.

DETAILED DESCRIPTION OF PREFERRED EMBODIMENTS

Figure 1:
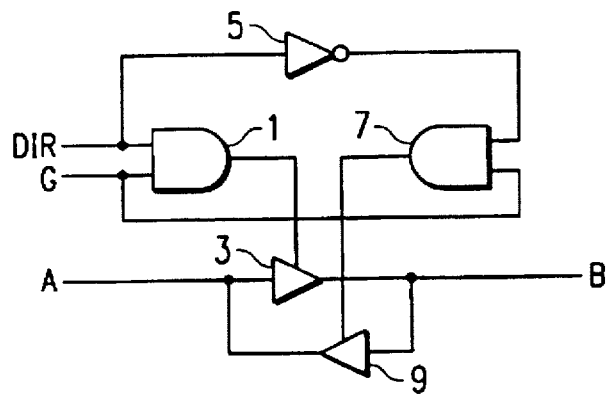
FIG. 1 depicts the circuit diagram of a prior art transceiver device.

In FIG. 1, a circuit diagram of a typical known transceiver circuit is shown. This diagram exemplifies devices that are commonly available, such as the Texas Instruments' LS245 transceiver. The transceiver of FIG. 1 has two bidirectional data ports, A and B, a directional control line DIR, and an enable input G.

In operation, AND gate 1 produces an output enable signal on a control line coupled to the A-to-B output driver 3 when both the DIR and G inputs are at a logic one value, enabling the transceiver to drive data from the A port to the B port. AND gate 7 produces an output enable signal on a control line to the B-to-A output driver 9 when the DIR input is at a logic zero value and the G input is a logic high, enabling the transceiver to drive from the B port to the A port. Inverter 5 is used to invert the DIR input for use at AND gate 7. When the G input is low, the device is disabled, so that the A and B ports are electrically isolated.

To use the transceiver of FIG. 1 in a system, the designer must couple the G and DIR lines to control lines. Typically these are driven by a processor. This requires that the designer have a pin available that is high when the processor is transmitting and low when the processor is receiving, and that a second control signal be available to enable the transceiver.

The transceiver of FIG. 1 provides drive current whenever the G line is high. This is true regardless of whether the current is necessary to maintain the value of the data on the port being driven. To conserve power, the system must move the G input up and down at various times so that the drivers are disabled when the drive is not needed. Providing this control requires fairly complex control circuitry.

Figure 2:
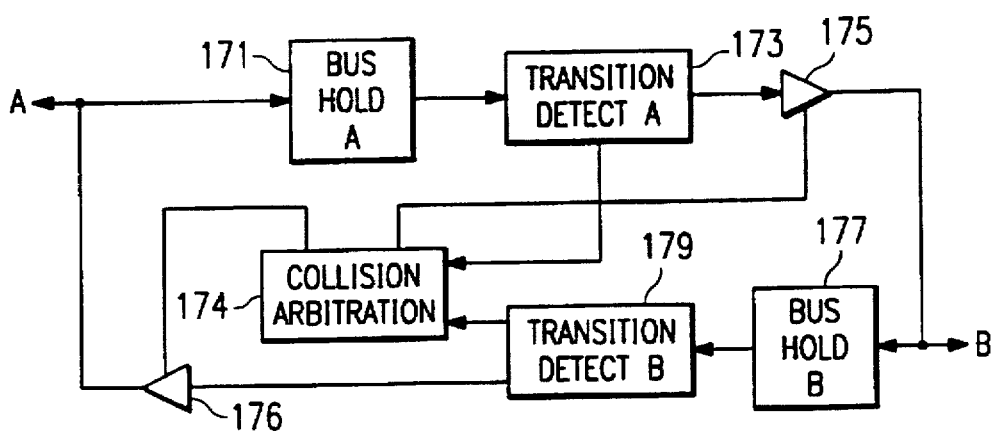
FIG. 2 depicts a block diagram of the bus transceiver circuit of the invention.

FIG. 2 depicts a block diagram of a first preferred embodiment transceiver circuit. Bidirectional port A is coupled to bus hold circuitry 171. Incoming data is passed through bus hold circuitry 171 to transition detection circuitry 173. The data again passes on to tri-state bus driver circuit 175, which has its output coupled to bidirectional port B. Transition detection circuitry 173 additionally has a transition detected output signal which is coupled to collision arbitration circuit 174. Collision arbitration circuitry 174 has as an output the control line for tri-state driver 175. In a symmetrical arrangement, bidirectional port B is coupled to bus hold circuitry 177. The data passes through the bus hold circuitry 177 and is coupled to transition detection circuitry 179. The transition detection circuitry outputs data to the tri-state bus driver 176 and a transition detection output to the collision arbitration circuitry 174. The collision arbitration circuitry has another output, this one connected to the output enable control line for tri-state driver 176. Tri-state driver 176 is further coupled to bidirectional port A.

In operation, the transceiver circuit of FIG. 2 will normally be in a state where the tri-state drivers are disabled, the bus hold circuits 171 and 177 being used to maintain the values on ports A and B. When a device coupled to one of the ports A or B places new data on the port, it will overdrive the bus hold circuitry at the respective port. The transition detection circuitry coupled to the bus hold circuitry will then output a transition detection signal to the collision arbitration circuitry 174. The transition detection circuitry will also transmit the data to the respective output driver 175 or 176. The collision arbitration circuitry will enable the indicated output driver and disable the other output driver. This prevents the transceiver circuitry from clashing with the transmitting device. The enabled output driver 175 or 176 will transmit on the respective bidirectional port. Note that this will cause the transition detection circuitry which is coupled to the receiving port to indicate a transition, however the collision arbitration circuit 174 is designed to lock out the second transition detected, so that the transceiver does not flip back and forth in direction. Transition detection circuitry 173 and 179 also provide a timed output signal to the drivers 176 and 175, so that the drivers are only enabled for the time required to bring the receiving bus to a stable data value. After that time has elapsed, the active driver is disabled by the transceiver device and the data value is maintained by the bus holder circuitry 171 or 177. In summary, the transceiver device of FIG. 2 detects a transition at either port A or B and automatically transmits the new data to the other port, locking out the reverse direction transfer to prevent clashes with the transmitting device. To conserve power consumption and to enable the transceiver to be ready to detect new data on the ports, the data transmission is timed so that the output drivers are active for as short a time as possible while maintaining data integrity.

Figure 3:
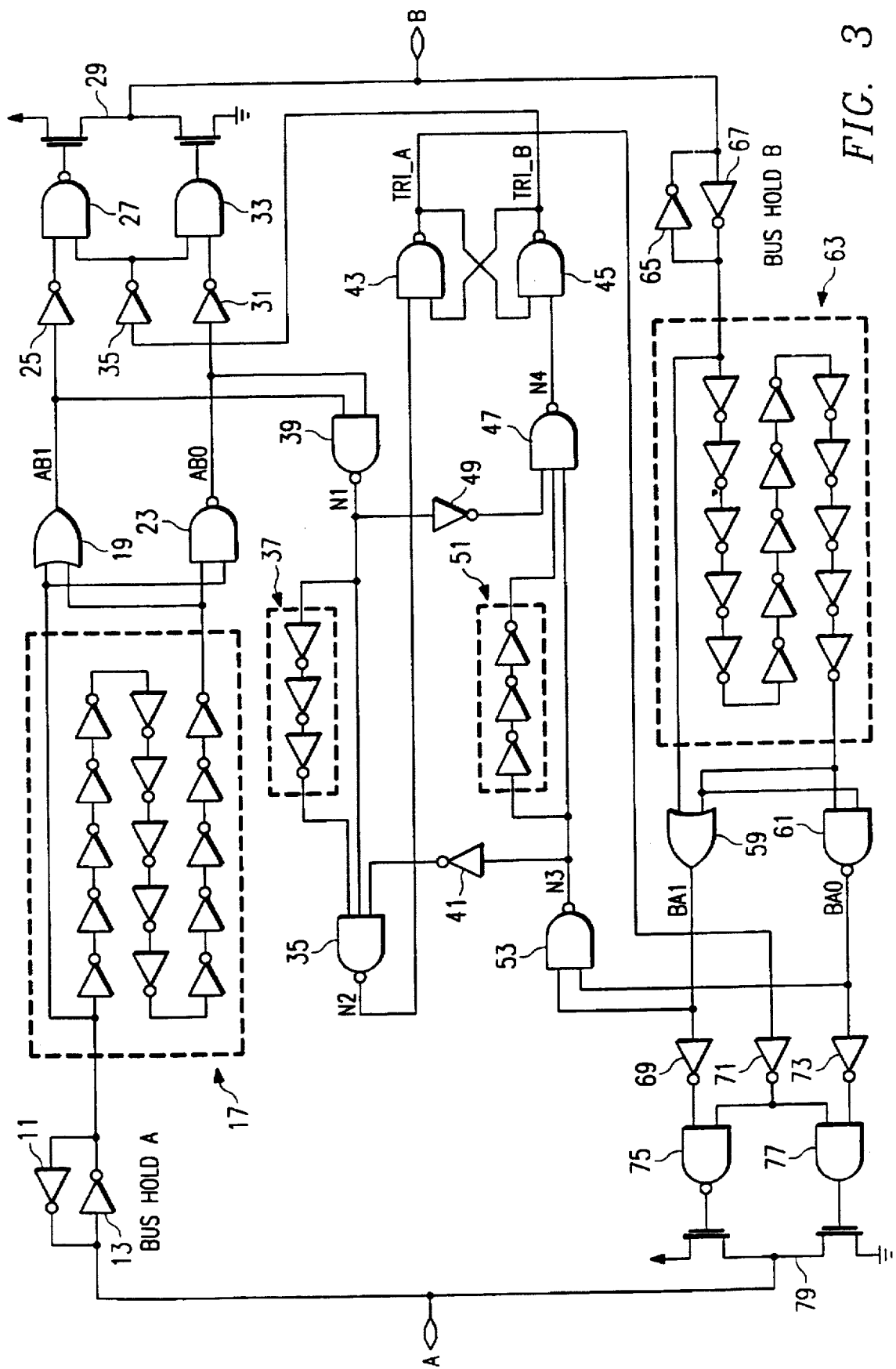
FIG. 3 depicts a circuit diagram of a preferred embodiment of the transceiver circuit of the invention.

FIG. 3 depicts a circuit diagram for an implementation of the first preferred embodiment transceiver circuit of FIG. 2. The circuitry of FIG. 3 may be grouped together into two data paths, each of which may be described in functional groups which correspond to the blocks of FIG. 2 as follows. Starting at port A, inverters 11 and 13 make up bus holder circuit 171 labeled BUS HOLD A in FIG. 3 which is coupled to bidirectional port A. The output of this bus holder circuit is coupled to transition detection circuitry 173 which consists of delay line 17, OR gate 19, and NAND gate 23. Delay line 17 and OR gate 19 are used to create an output at node AB1 which detects a rising edge at the output of the bus holder circuit. Delay line 17 and NAND gate 23 create an output at node AB0 which detects a falling edge at the output of the bus holder circuit. The tri-state output corresponding to driver 175 in FIG. 2 is implemented by inverters 25, 31, and 35, NAND gate 27 and AND gate 33, and CMOS output driver 29. The output of OR gate 19 of the transition detection circuitry is used to drive the pull-up transistor of output driver 29 through the NAND gate 27 and inverter 25. Similarly, the output of AND gate 33 is used to drive the pull-down transistor of CMOS output driver 29.

The collision arbitration circuitry 174 of FIG. 2 is implemented in FIG. 3 in two parts, the first part by NAND gate 39, delay line 37, NAND gate 35, and the latch formed of NAND gates 43 and 45. NAND gate 39 is used to create a high logic signal at node N1 whenever either node AB0 or AB1 is low, indicating a transition has been detected at port A. Delay line 37 and NAND gate 35 are a pulse generator and are coupled together to cause a one shot pulse of a predetermined length to be output at node N2 when a transition occurs at N1, that is when a rising or falling edge occurs at port A. The pulse at N2 drives one side of the latch formed by cross-coupled NAND gates 43 and 45. Assuming signal TRI_A is initially at a low value, and TRI_B is initially at a high value, TRI_B will be set to a low logical value in response to a negative transition at node N2. Inverters 25, 31, 35 are coupled to logic gates 27 and 33 to form output control circuitry for the CMOS output driver 29. NAND gate 27 receives the output of inverter 35, and the inverted version of AB1 from the inverter 25, as inputs. Thus, when a rising edge occurs at port A in FIG. 3, the two inputs to NAND gate 27 will eventually settle at high logic values, and the output will be a low logic value, so that the PMOS transistor of the CMOS output driver is enabled, and a high voltage will appear at port B. Similarly, if a falling edge is detected at port A, inverters 35 and 31 will cause the two inputs to AND gate 33 to be logic high values, and the output of the AND gate will be a logical one, so that the NMOS transistor of the CMOS output driver 29 will be enabled, and a low voltage will occur at port B.

FIG. 3 is symmetrical with respect to the two bidirectional ports. Thus the second data path and the functional groupings of the circuitry starting at port B can be made exactly in the same manner as the groupings were described above with respect to port A. Inverters 65 and 67 are coupled together to form bus holder circuitry 177 labeled BUS HOLD B. OR gate 59, delay line 63 and NAND gate 61 are coupled together to form transition detection circuitry 179 which detects a rising or falling edge at the B port. This is indicated by a logic zero appearing at node BA1 for a rising edge and a logic zero value appearing at the node BA0 for a falling edge.

The first part of collision arbitration circuitry 174 is described above. Collision arbitration circuitry 174 also includes NAND gate 53 which indicates that either a rising or falling edge has been detected by outputting a logical high value at the node N3. Delay line 51 and NAND gate 47 form a one shot pulse generator which causes a pulse of a predetermined length to occur at node N4 which drives the bottom input to the latch formed of NAND gates 43 and 45. As a result of a logic zero occurring at node N4, which is one input to NAND gate 45, and a logic one occurring at node N2 due to the gating operation of inverter 41 at the input of NAND gate 35, the node labeled TRI_A will settle at a logic zero. Node TRI_A is coupled to the output driver 176 of FIG. 2 which is implemented by control circuitry of the CMOS output driver 79, the output control circuitry consisting of NAND gate 75, AND gate 77, and inverters 69, 71 and 73. When a logic zero occurs at the input to inverter 71, the output of inverter 71 is a logic one which is coupled to one input of each of the two gates 75 and 77. If the BA1 node is low (active), the PMOS transistor of CMOS output driver 79 will be enabled, and a high voltage will appear at the A port. If node BA0 is low, indicating a falling edge has occurred, the AND gate 77 will have high values at both of its inputs and the NMOS transistor of CMOS output driver 79 will be enabled, causing a low voltage to appear at port A.

Thus, the first preferred embodiment bus transceiver consists of two data paths, one for the A port to the B port in FIG. 3, and one from the B port to the A port in FIG. 3, and control circuitry to enable and control the output drivers 29 and 79 in FIG. 3. The CMOS output drivers will drive data onto the respective ports only for a specified time duration which is determined by the width of the one-shot pulses generated in the transition detection circuitry. After this time duration (hereinafter referred to as $t_d$), the drivers will be disabled and the bus will be held in this state by the bus hold circuits comprised of inverters 11 and 13 for the A port and the bus hold circuit comprised of inverters 65 and 67 for the B port. The current state of the bus will thus be retained until the next active transition on the bus. A new transition on either port A or port B will cause the respective bus hold cell to flip and the transition detection circuitry of the respective data path will indicate a rising or falling edge, causing the one shot pulse generator of the respective data path to enable the associated output driver to drive the new data onto the receiving port. The collision arbitration circuitry will be reconfigured to cause data to flow in the opposite direction from the previous transaction, if necessary. This occurs primarily through resetting the latch formed of cross-coupled NAND gates 43 and 45.

A transmission of data from the A port of FIG. 3 to the B port of FIG. 3 will occur as follows: Assume the transceiver last transferred data from B to A, so that the TRI_A signal is low and TRI_B signal is high. A transition at the A port will be transmitted through the bus holder circuitry formed by inverters 11 and 13 and the transition will be detected by rising edge detection circuitry consisting of delay line 17 and OR gate 19, or failing edge detection circuitry consisting of delay line 17 and NAND gate 23. If a falling edge is detected, the AB0 node will be driven to a logic zero. If the transition is a rising edge, node AB1 will be driven to a logic zero. Delay line 17 is designed so that the widths of the pulses at nodes AB1 and AB0 are a predetermined time so that when the output driver 29 is enabled, the resulting active drive time is $t_d$ nanoseconds. The value $t_d$ may be increased or decreased by increasing or decreasing the number of inverters in the delay line. The value of $t_d$ is determined by system considerations, and should be long enough to allow the data value on the bus to settle and reflections to die off so that the bus hold circuitry can reliably maintain the resulting value on the bus after the driver is disabled.

NAND gate 39 combines the AB0 and AB1 values to output a value at node N1 which will be a logic one value whenever a transition is detected. NAND gate 35 and delay line 37 fore a one shot pulse generator which outputs a short duration low pulse at node N2 if inverter 41 is high. This pulse is used to set the latch formed by NAND gates 43 and 45. Initially, TRI_A is low, and TRI_B is a high, so that the NAND gate 43 sees two high inputs and maintains TRI_A at a low. When the low going pulse at node N2 arrives, NAND gate 43 transitions to a high output, causing NAND gate 45 to detect two high inputs and transition to a low; now TRI_A is a high logic level and TRI_B is a low logic level, that is, the latch has flipped. The output control circuitry which controls the CMOS output driver will now see a low logic value at node TRI_B, thus enabling the output of inverter 35 to gate the AB0 and AB1 signals through the output driver 29 and onto port B. The latch formed by cross-coupled NAND gates 43 and 45 thus indicates the direction of the transfers. The latch will remain enabled to transmit data from the A port to the B port until an incoming transition is detected at the B port, at which time the latch will be reset to enable the transfers in the opposite direction.

Output control circuitry formed from logic gates 27 and 33 will receive the inverted values of nodes AB1 and AB0 as inputs. Since one of these nodes is active when a falling edge is detected, and one is active when a rising edge is detected, only one of the two will be active for a given transition. If a rising edge is detected, NAND gate 27 will now have two logic ones as its inputs, and will output a logic zero to the gate of the PMOS transistor of CMOS output driver 29, thus providing a high voltage at port B. Conversely, if a falling edge is detected, AND gate 33 will receive two logic ones as its inputs and output a logic one. The NMOS transistor of CMOS output driver 29 will be enabled and a low voltage will appear at port B.

The driving time for the CMOS output driver 29 is determined by the length of the pulse generated from logic gates 19 and 23, which is controlled by the number of inverters used in the delay line 17. This is shown as 15 inverters in FIG. 3, but the number actually used will be determined by system requirements. In a user programmable embodiment, the circuit could be implemented on an integrated circuit having programmable length delay lines using fuse or anti fuse technology, or other options such as lead options, poly gate options, mask options, etc. Since the number of inverters in the delay line 17 is odd, the two inputs to logic gates 19 and 23 are normally opposite, so that the values at nodes AB0 and AB1 are normally high. When a transition occurs, both gates 19 and 23 will see equal values at both of inputs until the new value ripples through the delay line, and thus a pulse is generated at either AB0 or AB1, depending on whether both inputs to the logic gates are high or low. OR gate 19 produces a low output pulse at node AB1 when both of its inputs are low. NAND gate 23 produces a low output pulse when both of its inputs are high. This pulse is then transmitted through the output driver 29. Once the two inputs of the active logic gate 19 or 23 are again opposite values, the node AB0 or AB1 that was at a low level will rise to a high level, and the active output control logic gate 27 or 33 will disable the CMOS output driver 29.

For a transition at the B port, the circuitry of FIG. 3 has exactly the same operation as described above with respect to the A port. The data at the B port is transferred through bus hold circuitry 177 which consists of inverters 65 and 67 and into the transition detection circuitry 179 consisting of delay line 63 and logic gates 59 and 61. Depending on which kind of transition occurs, a low going pulse is generated at either node BA0 or BA1. NAND gate 53 then puts out a logic 1 at node N3. This pulse causes the one shot pulse generator logic formed by delay line 51 and NAND gate 47 to put out a pulse to the lower half of the latch consisting of NAND gates 43 and 45. Assuming that the latch initially is in a state where the TRI_A signal is high and the TRI_B signal is low, the latch will be caused to flip and will force a logic high level at node TRI_B if N2 is high, which disables the output driver control circuitry that controls CMOS output driver 29, so that no clash occurs at the B port, and which also forces a logic low level at node TRI_A, which enables the output control circuitry for CMOS driver 79, the output control circuitry consisting of NAND gate 75, AND gate 77, and inverters 69, 71, and 73. As the TRI_A input to inverter 71 is a logic low, the NAND gate 75 and AND gate 77 are enabled to respond to whichever transition detection node is active, node BA1 for rising edges and node BA0 for falling edges. If node BA1 is a logic low, inverter 69 transmits a logic one to NAND gate 75, which outputs a logic low and enables the PMOS transistor of CMOS output driver 79, so that a high voltage appears at port A. Similarly, if node BA0 is at a logic low, inverter 73 outputs a logic one to AND gate 77 which outputs a logic one to the NMOS transistor of CMOS output driver 79, and a low voltage appears at port A. Note that as long as the transitions continue to be detected at the B port, the bus control latch which outputs the TRI_A and TRI_B nodes will remain in the same state, so that the B port is the transmitter and the A port is the receiver. If an incoming transition is detected on the A port, the latch will be flipped back to the other direction.

The inverters 41 and 49 in FIG. 3 prevent bus clashes between the output drivers of the transceiver and the driving devices as follows: Again, assume that the transceiver is in a state where signal TRI_A is a low, and signal TRI_B is a high logic level, that is that the last transfer was from the B port to the A port. When a transition occurs at the A port, as described above, node N1 is driven to a high logic level. Inverter 49 couples this to one of the inputs of NAND gate 47. There is thus a low logic level at the input of NAND gate 47, which holds its output at a logic one value. When the pulse generated at node N2 in response to the high logic level at node N1 reaches the cross-coupled latch formed of NAND gates 43 and 45, the TRI_B signal will be forced to a low and CMOS output driver 29 will drive port B. The transition detection circuitry at port B will detect this, and node N3 will go to a high logic level indicating a change in the data values at port B. Delay line 51 will combine with the logic one at the input to NAND gate 47, and ordinarily would result in a logic zero at the node N4. However, inverter 49 disables NAND gate 47 in this instance. This prevents the latch formed of NAND gates 43 and 45 from being reset to enable the transceiver to drive in the opposite direction. If that happened, output driver 79 would be enabled and would drive the data at port B back to port A, clashing with the transmitting device.

Now assume that the last transfer was from the A port to the B port so that signal TRI_B is low and signal TRI_A is high. A transition occurs at the B port. Inverter 41 disables the NAND gate 35 from asserting a logic zero at node N2, thus preventing the latch consisting of NAND gates 43 and 45 from flipping and enabling the output driver 29 to drive onto the B port. Inverters 41 and 49 thus create a temporary lock out feature, preventing the transceiver circuit from reflecting the data back to the driving bus and preventing the direction control circuitry consisting of the latch and signals TRI_A and TRI_B from erroneously flipping back and forth in state.

FIG. 3 depicts the circuitry required to implement a single bit transceiver. In using the invention to implement a multiple bit circuit, the circuitry of FIG. 3 can be repeated for each bit. This implementation has the advantage that only those bits that change value from one data word to the next are actively driven by the output drivers, so that no unnecessary power consumption occurs. Alternatively, a number of data bits could be combined, by combining the results of the input detection circuitry of each bit, and share the control circuitry and pulse generator circuitry of FIG. 3. Practitioners in the art will recognize many possible variations for use of the invention in FIG. 3, all of which are contemplated as part of the invention described herein.

In designing the time period $t_d$ for the active driving period of the CMOS output drivers 29 and 79 in FIG. 3, the member of inverters in delay lines 17 and 63 is varied. Note that as implemented in FIG. 3, the number of inverters in the delay line needs to be odd. The length of the pulses put out by logic gates 19, 23, 59 and 61 is determined by the time it takes a new data value to ripple through the delay lines so that the two inputs to the respective logic gates are once again unequal.

FIG. 4 is a waveform timing diagram showing the operation of the circuitry in FIG. 3. Critical nodes from FIG. 3 are shown in FIG. 4 for a typical data transfer from port A to port B in FIG. 2. Starting at the top of the waveform timing diagram, line 1 represents the logic value at port A. Line 2 represents the logic value at port B. Line 3 represents the logic value at node AB1. Line 4 represents the logic value at node AB0. Line 5 represents the logic value at node N1 of FIG. 3. Line 6 represents the logic value at node N2. Line 7 represents the logic value at node BA1. Line 8 represents the logic value at node BA0. Line 9 represents the logic value at node N3. Line 10 represents the logic value at node N4. Lines 11 and 12 represent the logic values of the outputs of the bus control latch in FIG. 3, nodes TRI_A and TRI_B, respectively.

In the sequence of events shown in FIG. 4, first assume the circuit of FIG. 3 is initially quiescent with the latch formed from cross-coupled NAND gates 43 and 45 being in a state where the TRI_B line is high, so that the output driver 29 is disabled, and the TRI_A line is low, so that the output driver 79 is able to drive onto the A port. However, since no activity is shown at nodes BA1 and BA0, no drive is provided initially. The bus hold circuits are active and maintain the A and B ports at their initial states. First, a rising pulse appears at the A port. This is labeled event a in the diagram. Following the input at port A, a pulse appears at node AB1, this is labeled event b in the diagram. This pulse indicates that a rising edge has been detected at the A port. The low logic level at node AB1 causes NAND gate 39 to output a high logic level at node N1. This is labeled event c in the diagram. The high logic level at node N1 causes the pulse generation circuitry of NAND gate 35 and delay line 37 to generate a pulse at node N2. This short duration active low pulse is labeled event d in the diagram. This low pulse sets the cross-coupled latch formed from NAND gates 43 and 45, and causes a flip in signals TRI_A and TRI_B. This is labeled event e in the diagram. As the TRI_B node is now at a low level, inverter 35 enables gates 27 and 33 to control output driver 29, and since there is a low value at the input of inverter 25, output driver 29 drives a high level at the B port. This is labeled event f in the diagram.

Next, a transition occurs at the B port caused by the active high signal driven by output driver 29. The input detection circuitry coupled to the B port now indicates a rising edge by outputting a low logic level on the BA1 node. This is labeled event g in the diagram. The low logic level at node BA1 causes NAND gate 53 to generate a logic one at node N3. This is labeled event h in the diagram. However, since the transceiver is driving out on the B port, inverter 49 disables NAND gate 47, so no logic low level can occur at node N4. It has been locked out. This is labeled event i in the diagram.

Note the length of the pulses on AB1 node and the BA1 node in FIG. 4. These pulse lengths determine how long data will be actively driven onto the bus. Once $t_d$ nanoseconds pass, the transition detection circuitry returns to an inactive state and no more current is driven out onto the bus, the value on the busses being maintained by the bus hold circuitry. For this example, the AB1 node will transition back to a high level. This is labeled event j in the diagram of FIG. 4

At event k in the diagram, a second transition occurs at the A port. Now the A port falls back to zero. At event l, a low logic level appears at node AB0, indicating a falling edge is detected. At event m, NAND gate 39 reacts to this transition by putting out a logic one. At event n, NAND gate 35 generates a low going pulse at node N2 to set the latch. However, since the cross-coupled latch and the TRI_A and TRI_B nodes are already in the right state, no further change is seen in these nodes. At event o, the AND gate 33 is enabled and the low value appears on the B port. Again, the B port detects a transition, and a falling edge is detected. This is indicated as event p, and shows up as a low going pulse at node BA0. Node N3 is then driven high level to indicate a transition on the B port. This is event q. Again, the lock-out of inverter 49 prevents a pulse on node N4 from occurring. This is event r in the diagram. After $t_d$ time units, the low going pulse at node BA0 ends. This is event s in the diagram.

The operation of the transceiver circuit of the invention when a transition is detected on the B port is exactly symmetrical to that described above.

FIG. 5 depicts the transceiver circuit of the invention being implemented as a multiple bit integrated circuit transceiver 83 and in use in a typical system application wherein microprocessor 81 is coupled to an integrated circuit 85, which might be an ASIC having a user specified function. Circuit 85 could be any device which sends and/or receives data, such as a memory, UART, coprocessor, or as shown, an ASIC.

In operation, the transceiver circuit 83 will detect any new data on either the A or B port and transmit it to the other port. Because the transceiver circuitry will immediately transfer data automatically from one port to the other, it is important that the system be one where it is known when data will be transmitted by the various devices, so that no bus clashing occurs. This is typically the case. For example, in FIG. 5, microprocessor 81 might send out a read request to ASIC 85. Once the request is sent, the microprocessor knows data is expected back from the ASIC 85 device and therefore will not put data out on the bus until the read data is received.

FIG. 6 depicts an alternative embodiment of the invention, which 3is suitable for use as a sleep mode control circuit on a microprocessor other device. Bus hold circuitry BUS HOLD A is again formed from weak inverter 87 and an input buffer 89, and coupled to the data bus at the A port. The DATA output is to be coupled to the logic circuitry of the device. Transition detection circuitry is formed from delay line 93, inverter 89, and logic gates 95, 99 and 97, so that on detecting a transition NAND gate 99 puts out a high logic level on output WAKE. The length of this active high signal is determined by the delay provided by delay line 93.

In operation, a change in the data present at the input to the bus hold circuitry consisting of inverters 87 and 89 will cause the bus holder circuit BUS HOLD A to flip and the data will be transmitted on to the transition detection circuitry. NAND gates 95 and 97 indicate a rising or falling edge at the input, respectively. NAND gate 99 outputs a signal WAKE which is high whenever either NAND gate 95 or 97 puts out a low signal. The length of the signal WAKE is determined by the number of inverters and the amount of delay used in delay line 93. The circuitry of the invention can be coupled to any incoming signal of interest in a circuit which has a standby or "sleep" mode and will indicate when activity occurs at the signal of interest. The embodiment of FIG. 6 provides a "wake" capability using the data lines of the device, so that no other pins are required. Typically, the embodiment of FIG. 6 would be used at the data inputs to a microprocessor.

FIG. 7 depicts an alternative embodiment of the invention for use as a bus kicker cell or termination circuit. In FIG. 7, the input transition detection circuitry of the invention is coupled with a single CMOS output driver to provide a single input/output device having a timed active output driver. Inverters 101, 103, delay line 105, and NAND gate 107 provide an edge detection signal that is a low going pulse when a rising input is detected at the A terminal of FIG. 7. Inverter 109 and delay line 111 combine with NAND gate 113 to create a low going pulse when a falling edge is detected at the A terminal. Inverter 115 then inverts this to gate the NMOS transistor of CMOS driver 117 on to pull the output down when a low going input transition is detected. NAND gate 107 gates the PMOS transistor of CMOS driver 117 on to pull the output up when a high going transition is detected at the A terminal.

As with the other embodiments of the invention, the embodiment of FIG. 7 will have an active output for a predetermined time period before returning to a tri-state or high impedance state. The time period is system specific and is controlled by the number of inverters used in delay lines 111 and 105.

In operation, the embodiment of FIG. 7 can be used in any heavily loaded bus environment where it is desirable to provide additional drive to speed up transitions of the bus state. Whenever a transition is detected at the A terminal, the kicker cell of FIG. 7 will detect the transition and provide a limited duration active drive that matches the transition. It is perhaps most useful in reflected wave switching busses where weak drivers are coupled to the bus. In reflected wave switching busses without the invention, it is intended that the weak driver assert a low threshold signal on the bus, the resulting incident wave then travels to a termination of the bus and reflects, the reflection doubling the incident wave which is now of sufficient threshold to be detected as a valid transition of the bus state by the other devices on the bus. However, the bus is necessarily slow due to the time requirement for the switching signal to travel down the bus and reflect and return. The embodiment of FIG. 7 can be used with such a bus to improve the switching speed.

Inverters 101 and 109 in FIG. 7 determine the triggering thresholds of the kicker cell, this threshold will determine the sensitivity of the device. Inverter 101 is labeled LOW INPUT THRESHOLD in the figure. Because this inverter is the first device in the rising edge transition detection circuitry, it must detect a rising edge that is fairly low. The threshold for this device must be set according to the particular system and bus environment, but must be a lower threshold than the other devices on the bus. Similarly, inverter 109, labeled HIGH INPUT THRESHOLD, is the first circuit element in the transition detection circuitry for a low going pulse. Inverter 109 must be sized so as to have a high input threshold that will detect a small drop in voltage on the bus as a low going pulse. These thresholds must be set so as to detect a transition without being overly sensitive to noise on the bus.

Figure 8:
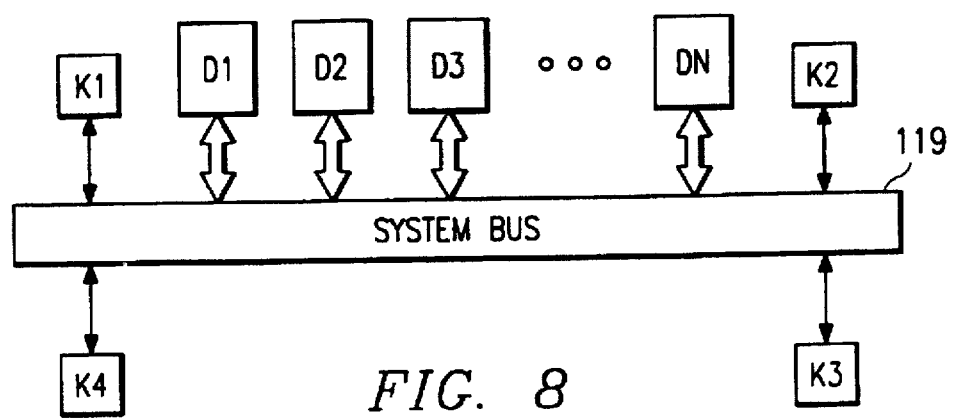
FIG. 8 depicts a block diagram of a typical bus system using the bus kicker circuit of FIG. 7.

FIG. 8 depicts a typical application for the kicker cell of FIG. 7. In FIG. 8, a peripheral components interconnect (hereinafter PCI) bus environment is depicted. Unlike an incident wave switching bus, the PCI bus is a reflected wave switching bus. The devices on the bus are not required to provide enough signal drive to immediately switch the bus, instead additive wave reflections are used to increase the incident wave to a level that the input devices coupled to the bus can switch on. In FIG. 8, devices D1, D2, D3, up to DN are shown coupled in parallel to the bus 119. Each device D1–DN is assumed to have weak output drivers such as those found on typical CMOS ASIC's. These drivers are not capable of completely switching the bus on the incident wave. The PCI bus standard assumes that the reflected wave which follows an initially weak incident wave will be larger than the original incident wave and that the reflected wave can trigger the input buffers of the devices coupled to the bus. In FIG. 8, four of the kicker cell devices of FIG. 7, labeled K1, K2, K3 card K4 in FIG. 8, are coupled to the bus.

In operation, assume that initially no activity is taking place on the bus. Assume a device asserts new data on the bus 119. This transition creates an weak incident wave on the bus. If the bus is a typical PCI bus, the incident wave might be less than a volt different from the quiescent state of the bus. The kicker cells will detect the weak voltage transition and repeat the transition with their output drivers, creating additional drive for a time period determined by the length of the delay lines in FIG. 7. This will speed the transition of the bus to its new state. It has been estimated this could speed the bus transition time up by 2–3 nanoseconds. This can be a significant savings in a bus operating at system speeds of greater than 50 Mhz, where a total time period of less than 20 nanoseconds is available between clock edges.

A 48-bit PCI bus application for the kicker cell transceiver has been modeled. Assuming that the end-to-end transition travel time is 5 nanoseconds, without the kicker cells the PCI bus takes 10 nanoseconds to switch, 5 nanoseconds for the incident wave started by a driving device at one end to travel to the other end, and 5 nanoseconds for the reflected wave to return. By placing four 24-bit kicker cell transceivers on the bus, two for bits 0–47 at one-quarter and two for bits 0–47 at three-quarters of the total length of the bus, the total bus transition time was shown to be reduced to 5.5 nanoseconds. Note that both the length of the delay lines in the kicker cell and the input thresholds of the input inverter devices must be set to match the particular system and bus environment.

A few preferred embodiments have been described in detail hereinabove. It is to be understood that the scope of the invention also comprehends embodiments different from those described, yet within the scope of the claims.

What is claimed is:

1. A bus kicker cell for accelerating bus transitions, comprising:

a bidirectional data port for coupling to said bus;

a first input transition detector circuit coupled to said bidirectional data port, having an output indicating a high-to-low transition has occurred at said port;

a second input transition detector circuit coupled to said bidirectional data port, having an output indicating a low-to-high transition has occurred at said port; and an output driver coupled to said port, and having inputs coupled to said first and second input transition detectors, for driving said bidirectional data port to reinforce at said bidirectional data port a transition detected by said first or second input transition detector.

2. The bus kicker cell of claim 1, wherein said first and second input transition detector circuitry each comprises:

an input coupled to said bidirectional data port;

a delay line coupled to said input, having an output that is a delayed version of the signal at said input; and comparison circuitry for comparing the signal at said input to the delayed output, having an output that indicates when the signal and the delayed signal are different.

3. The bus kicker cell of claim 1, further comprising:

timing circuitry for enabling said output driver to actively drive said bidirectional port for a predetermined time, then to place said output driver in a disabled state until the next transition occurs.

4. The bus kicker cell of claim 1, and further comprising:

a first sized input buffer circuit coupled between said first input transition detector circuit and said bidirectional port, the first sized input buffer having an input threshold set for triggering in response to a weak high to low transition; and a second sized input buffer circuit coupled between said second input transition detector circuit and said bidirectional port, the second sized input buffer having an input threshold set for triggering in response to a weak low to high transition.

* * * * *